(12) United States Patent
Pappalardo et al.

(10) Patent No.: US 7,733,396 B2
(45) Date of Patent: Jun. 8, 2010

(54) PROCESS AND SYSTEM FOR PROCESSING SIGNALS ARRANGED IN A BAYER PATTERN

(75) Inventors: Francesco Pappalardo, Paternò (IT); Alessandro Capra, Gravina di Catania (IT); Massimo Mancuso, Monza (IT); Hervé Broquin, Cesson-Sévigné (FR); Paolo Antonino Fodera, Marsala (IT); Elena Salurso, Agropoli (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 1854 days.

(21) Appl. No.: 10/696,396

(22) Filed: Oct. 29, 2003

(65) Prior Publication Data

US 2004/0135908 A1 Jul. 15, 2004

(30) Foreign Application Priority Data

Oct. 29, 2002 (EP) .................................. 02425655

(51) Int. Cl.
*H04N 3/14* (2006.01)
*H04N 5/335* (2006.01)
*H04N 9/04* (2006.01)
*H04N 7/12* (2006.01)
*H04N 11/02* (2006.01)
*H04N 11/04* (2006.01)

(52) U.S. Cl. ............. 348/273; 375/240.18; 375/240.12

(58) Field of Classification Search ............ 348/272, 348/273; 382/232, 233, 248; 375/240.18; 341/11, 114

See application file for complete search history.

(56) References Cited

U.S. PATENT DOCUMENTS

| 5,528,292 | A | | 6/1996 | Ikeda | 348/222 |
|---|---|---|---|---|---|
| 6,154,493 | A | * | 11/2000 | Acharya et al. | 375/240.19 |
| 6,229,578 | B1 | * | 5/2001 | Acharya et al. | 348/607 |
| 6,744,929 | B1 | * | 6/2004 | Okada | 382/251 |
| 7,199,825 | B2 | * | 4/2007 | Guarnera et al. | 348/272 |
| 2003/0048369 | A1 | * | 3/2003 | Guarnera et al. | 348/273 |

FOREIGN PATENT DOCUMENTS

EP 1150467 10/2001

OTHER PUBLICATIONS

Childers et al., Reordering Memory Bus Transactions for Reduced Power Consumption, Languages, Compilers, and Tools for Embedded Systems, ACM Sigplan Workshop LCTES 2000, Proceedings (Lecture Notes in Computer Science, vol. 1985), Proceedings, Vanco, 2001, Berlin, Germany, pp. 146-161, XP002238671.

(Continued)

*Primary Examiner*—Kelly L Jerabek
(74) *Attorney, Agent, or Firm*—Lisa K. Jorgenson; Allen, Dyer, Doppelt, Milbrath & Gilchrist, P.A.

(57) ABSTRACT

Digital video signals, such as the signals generated by an image sensor in a Bayer format, are converted into an encoded format. In the Bayer format, the pixels of each line are alternately coded with two colors, and then converted into the encoded format. In the encoded format, the pixels of the digital video signals are reordered into sets of adjacent pixels, such that the sets group pixels coded with the same color. The encoded signal data results in a reduced switching activity when transmitted over a bus.

27 Claims, 2 Drawing Sheets

OTHER PUBLICATIONS

Benini et al., System-Level Power Optimization of Special Purpose Applications: The Beach Solution, Proceedings 1997 International Symposium on Low Power Electronics and Design (IEEE Cat. No. 97TH8332), Monterey, CA, Aug. 18-20, 1997, pp. 24-29, XP002238670.

Stan et al., Bus-Invert Coding for Low-Power I/O, IEEE Transactions on Very Large Scale Integration (VLSI) Systems, IEEE Inc., New York, US, vol. 3, No. 1, Mar. 1, 1995, pp. 49-58, XP000500301.

* cited by examiner

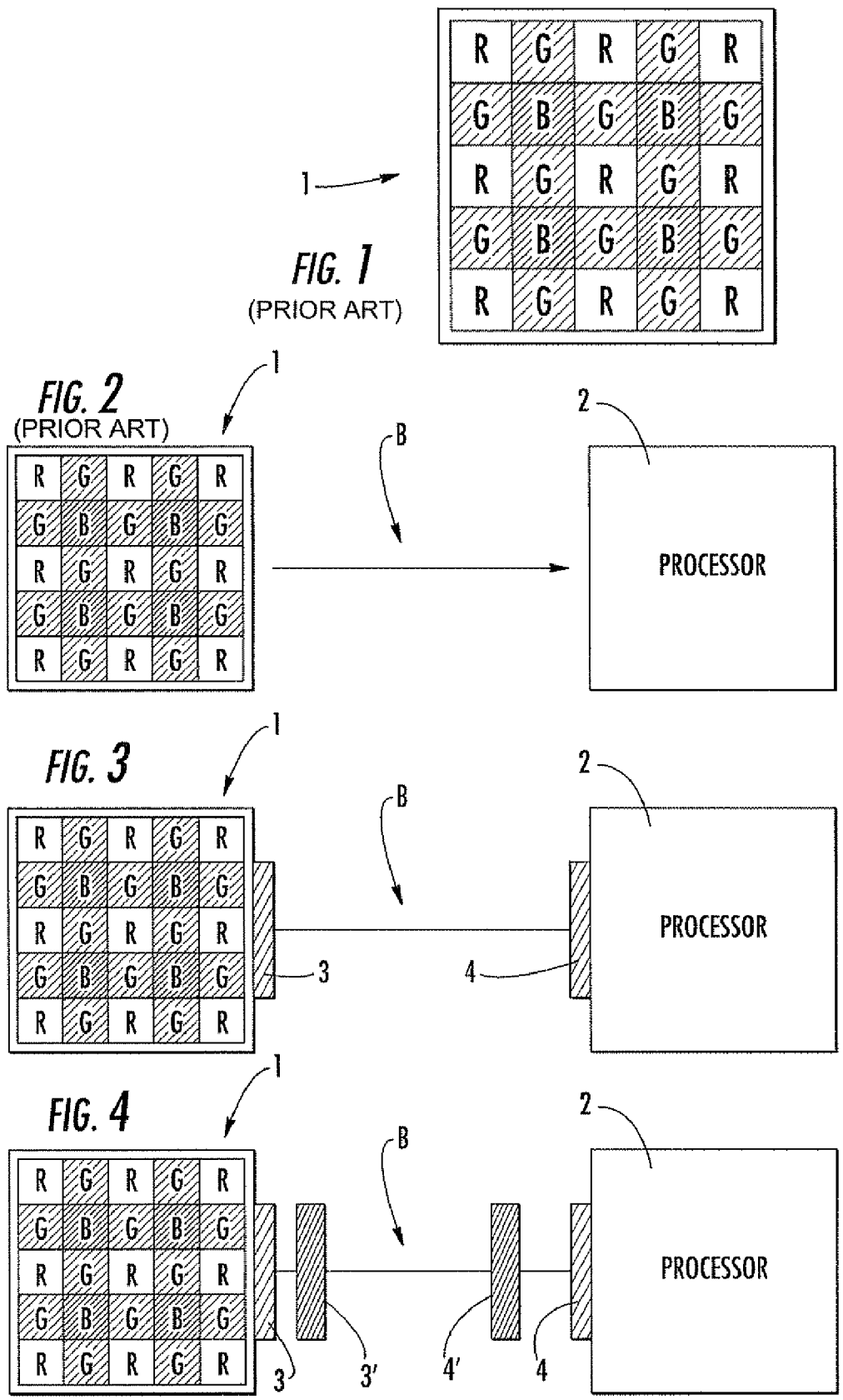

PROCESS AND SYSTEM FOR PROCESSING SIGNALS ARRANGED IN A BAYER PATTERN

FIELD OF INVENTION

The present invention relates to a technique for reducing bus transitions, i.e., reducing switching activity (SA) on a bus. The present invention has been developed with application to the transmission of signals in the Bayer format.

BACKGROUND OF THE INVENTION

Digital signals in the Bayer format, such as those provided by an image sensor in a camera for example, have the format shown in FIG. 1. Basically, a matrix format is being dealt with in which each row is alternately coded with two colors: odd rows are alternately coded with the red and green colors, while even rows are alternately coded with the green and blue colors. In the layout shown in FIG. 1, the respective letters R, G and B stand for red, green and blue.

When an image sensor, such as the one schematically indicated as reference 1 in FIG. 2, is to be connected to a processor 2 for processing the pixel data to reconstruct the image, a problem arises due to the fact that data items in the Bayer format are highly uncorrelated with each other. During transmission on the bus B to the processor 2 (FIG. 2), the data in question gives rise to a high switching activity.

The problem can be addressed, at least in principle, by applying data encoding techniques on the bus B for reducing switching activity. For example, on small-size buses, such as those up to 8 bits, the technique known as bus inverter (BI) is a good encoding technique for the majority of cases. The results deriving from the application of this technique can vary, and in quite a significant manner, depending on the type of data being transmitted.

SUMMARY OF THE INVENTION

In view of the foregoing background, an object of the present invention is to provide a process for converting digital video signals between a Bayer format and an encoded format.

This and other objects, advantages and features in accordance with the present invention are provided by a process for converting digital video signals between a Bayer format and an encoded format, with pixels in each line of the Bayer format being alternately coded with two colors, and the digital video signals in the encoded format having a reduced switching activity when transmitted over a bus as compared to the digital video signals in the Bayer format being transmitted over the bus. The process comprises ordering the pixels in sets of adjacent pixels in the encoded format, with the sets respectively grouping pixels that code a same color.

Another aspect of the present invention is directed to system for converting digital video signals between a Bayer format and an encoded format, with pixels in each line of the Bayer format being alternately coded with two colors, and the digital video signals in the encoded format having a reduced switching activity when transmitted over a bus as compared to the digital video signals in the Bayer format being transmitted over the bus. The system comprises at least one converter element connected to the bus for converting between the Bayer format and the encoded format so that, in the encoded format, the pixels are ordered in sets of adjacent pixels, with the sets respectively grouping pixels that code a same color.

The present invention is thus based on performing an ordered encoding of the sequence of Bayer format data provided as input to the transmission bus. This reduces the transitions during transmission on the bus. The data is then reordered into the Bayer format at the output of the transmission bus.

BRIEF DESCRIPTION OF THE DRAWINGS

The present invention will now be described by way of a nonlimiting example, with reference to the enclosed drawings, in which:

FIGS. 1 and 2 generically illustrate application of the present invention;

FIG. 3 illustrates, in general terms, an architecture for the transmission of Bayer data over a bus operating in accordance with the present invention;

FIG. 4 illustrates an extension of the architecture as shown in FIG. 3; and

DETAILED DESCRIPTION OF THE PREFERRED EMBODIMENTS

Figure 5:
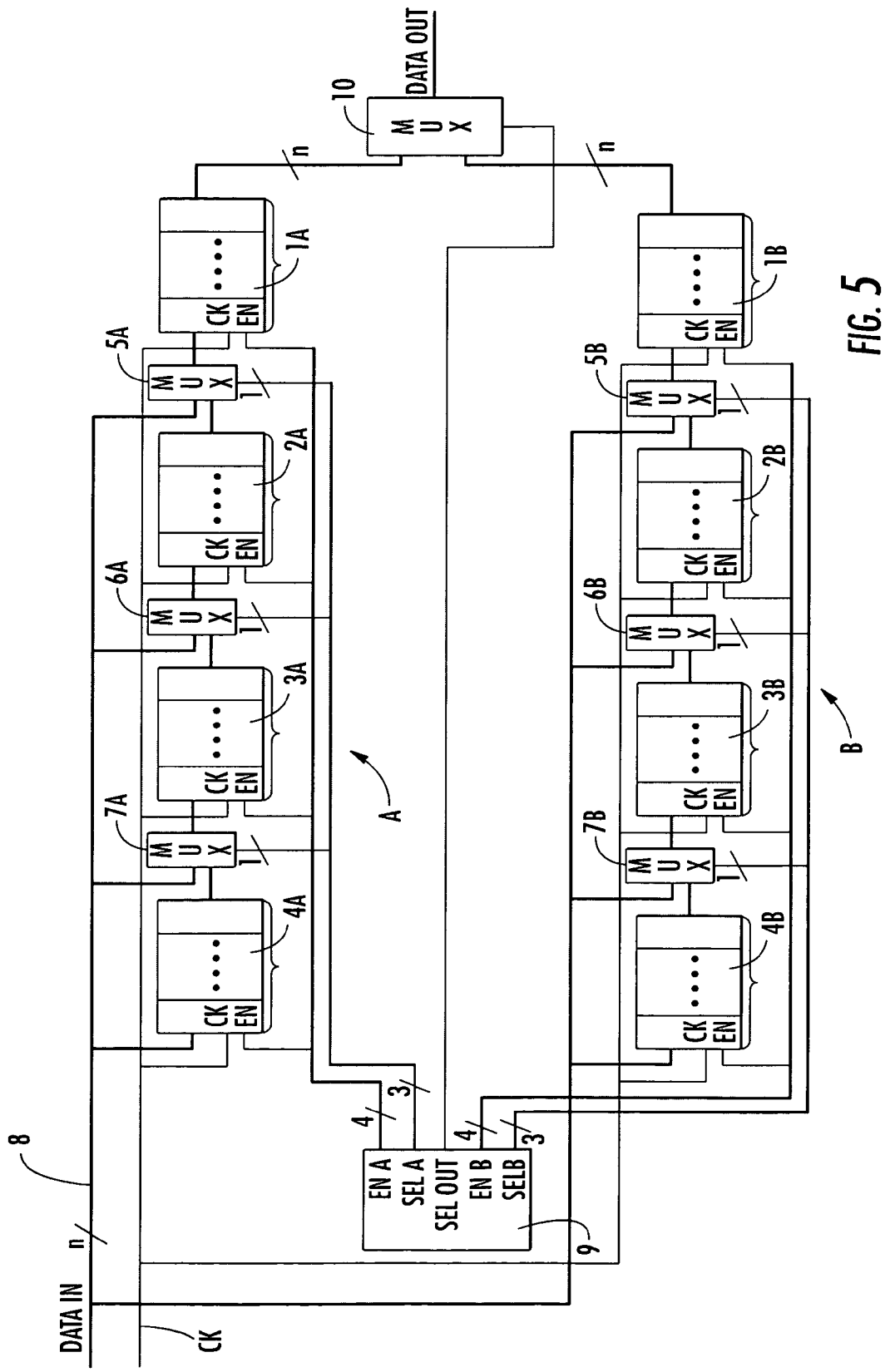
FIG. 5 illustrates a block diagram of an encoder operating in accordance with the present invention.

The following is not to be interpreted as a limitation with regards to the scope of the present invention. It will be presumed that in an application context such as that represented in FIG. 2 (transmission of video data acquired by a sensor 1 in a Bayer format to a processor 2 via a bus B), 640*480 pixels for example, transmit on the connection bus. The transmission is between the sensor 1 and the processor or controller 2 for each image in a VGA format.

This communication absorbs a large quantity of power due to the effect of induced transitions on the connection bus B. To better understand the motives of this situation (which are likely to arise for any number of bits representing the pixels and for any size of bus), it is presumed that the pixels have a color represented by k bits and that the connection bus B between the sensor 1 and the processor 2 is a k/2 bit bus.

For this system, it is presumed that the sensor has n pixels per column (five pixels in the illustrated example), and there are a total of m rows (in this case totaling five in number). Each color is first transmitted with k/2 bits of the upper part (from bit k-1 to bit k/2), and then the k/2 bits of the lower part (from bit [k/2-1] to bit 0).

The output data can thus be represented in the following manner:

$P_{1,1}(R)H, P_{1,1}(R)L, P_{1,2}(G)H, P_{1,2}(G)L, \ldots, P_{1,n-1}(G)$
$H, P_{1,n-1}(G)L, P_{1,n}(R)H, P_{1,n}(R)L, P_{2,1}(G)H, P_{2,1}$
$(G)L, P_{2,2}(B)H, P_{2,2}(B)L, \ldots, P_{2,n-1}(B)H, P_{2,n-1}$
$(B)L, P_{2,n}(G)H, P_{2,n}(G)L, \ldots, P_{m,1}(R)H, P_{m,1}(R)$
$L, P_{m,2}(G)H, P_{m,2}(G)L, \ldots, P_{m,n-1}(G)H, P_{m,n-1}$
$(G)L, P_{m,n}(R)H, P_{m,n}(R)L$ where:
$P_{1,1}(R)H$=Pixel row 1, position 1 (Red) upper bits
$P_{1,1}(R)L$=Pixel row 1, position 1 (Red) lower bits
$P_{1,2}(G)H$=Pixel row 1, position 2 (Green) upper bits
$P_{1,2}(G)L$=Pixel row 1, position (Green) lower bits
. . .
$P_{m,n}(R)H$=Pixel row m, position n (Red) upper bits
$P_{m,n}(R)L$=Pixel row m, position n (Red) lower bits Values in the output data from the sensor 1 are found to be highly uncorrelated with each other, and this reflects in the high switching activity on the bus B.

The idea at the base of the present invention is therefore that of reorganizing the data, with regards to both the position of upper and lower bits and the color represented by the pixels, and consequently, transferring the data (with reference to the above example) on the basis of the sequence specified below:

$$P_{1,1}(R)H, P_{1,3}(R)H, \ldots, P_{1,n}(R)H, P_{1,1}(R)L, P_{1,3}(R)L, \ldots P_{1,n}(R)L, P_{1,2}(G)H, P_{1,4}(G)H, \ldots, P_{1,n-1}(G)H, P_{1,2}(G)L, P_{1,4}(G)L, \ldots P_{1,n}(G)L, P_{2,1}(G)H, P_{2,3}(G)H, \ldots, P_{2,n}(G)H, P_{2,1}(G)L, P_{2,3}(G)L, \ldots P_{2,n-1}(G)L, P_{2,2}(B)H, P_{2,4}(B)H, \ldots, P_{2,n-1}(B)H, P_{2,2}(B)L, P_{2,4}(B)L, \ldots P_{2,n-1}(B)L, \ldots, P_{m,1}(R)H, P_{m,3}(R)H, \ldots, P_{m,n}(R)H, P_{m,1}(R)L, P_{m,3}(R)L, \ldots P_{m,n}(R)L, P_{m,2}(G)H, P_{m,4}(G)H, \ldots, P_{m,n-1}(G)H, P_{m,2}(G)L, P_{m,4}(G)L, \ldots P_{m,n-1}(G)L.$$

To implement the encoding from the previously seen classical format to the encoded format shown above, it is sufficient to associate the output of the sensor 2 with an encoder 3 that receives the data in the classical format and transforms it into the encoded format ready for transmission on the bus B.

Symmetrically, a decoder 4 is at the input to the processor 2, which receives the data in the encoded format and transforms it back to the classical format for input to the processor 2. In effect, the encoder 3 reorders the pixels that are ordered in the Bayer format so that pixels of the same color are grouped together as much as possible.

In fact, by comparing the previously illustrated classical data format and the encoded format, it is immediately obvious that the first (classical format) has a high recurrence of situations in which the relative colors of adjacent pixels are different. On the contrary, data in the second form (encoded format) is grouped into a first group or set of pixels relative to a first color (red in the illustrated example), followed by a second group or set of pixels of a second color (green in the illustrated example) and, lastly, a group or set of pixels relative to the third color (blue in the illustrated example). In addition, grouping the upper and lower parts of the data items reduces data variance.

In a possible embodiment of the encoder circuit 3, the operation of which is timed by a clock signal CLK, are provided by a series of k-bit registers (typically flip-flops) that contain the pixels of an entire row. In particular, the registers in question are grouped into four blocks for the purposes of containing:

in the first block, the upper part (H) of the set of pixels in odd positions and which belong to the row being dealt with each time; in the case of the sensor shown in FIGS. 1 to 4, for example, the upper part of the red pixels for the first row could be handled;

in the second block, the lower part of the set of pixels in odd positions and which belong to the row being processed each time; in the case of the sensor shown in FIGS. 1 to 4, for example, the lower part of the red pixels for the first row could be handled;

in the third block, the upper part of the set of pixels in even positions and which belong to the row being processed each time; in the case of the sensor shown in FIGS. 1 to 4, for example, the upper part of the green pixels for the first row could be handled; and in the fourth block, the lower part of the set of pixels in even positions and which belong to the row being processed each time; in the case of the sensor shown in FIGS. 1 to 4, for example, the lower part of the green pixels could be handled.

The above indicated blocks or registers are dimensioned to contain all the data items of a row minus 4. In addition, the registers in question are preferably duplicated over two lines. The first line includes four first registers 1A, 2A, 3A and 4A (line A), and the second line includes four second registers 1B, 2B, 3B and 4B (line B). This permits a maximum speed of operation to be maintained. While data is loaded into one line (line A instead of line B for example), the data grouped in the other line (line B instead of line A for example) can be sent.

Multiplexers 5A, 5B, 6A, 6B, 7A and 7B are provided at the input to the above described registers (except for the blocks 4A and 4B). They are to pass to the input of their respective block, which is either the input signal present on a line 8 and known as Data in (generically n-bit) or alternatively, the output signal of the block immediately upstream.

Reference 9 indicates a control unit for blocks 1A, 2A, 3A and 4A, as well as for the multiplexers 5A, 6A and 7A. In a symmetrical manner, the control unit 9 is also for the blocks 1B, 2B, 3B and 4B, as well as for the multiplexers 5B, 6B and 7B, via corresponding enabling EN_A and EN_B signals and selection SEL_A and SEL_B signals. The suffixes A and B indicate the lines and the blocks to which the control signals are intended.

Reference 10 indicates a multiplexer for the outputs, that is, an overall output for the circuit. The output data is indicated as Data out, and is from either the data available on block 1A or the data available on block 1B as a function of a selection signal SEL_OUT produced by the control unit 9.

The control unit 9 operates according to the following criteria:

1) acquire a first data item at an input, shift block 1A by one position and write it in the register that has just been freed.

2) acquire a second data item at an input, shift block 2A by one position and write it in the register that has just been freed.

3) acquire the next data item at an input, shift block 3A by one position and write it in the register that has just been freed.

4) acquire the next data item at an input, shift block 4A by one position and write it in the register that has just been freed.

5) acquire the first data item at an input, shift block 1A by one position and write it in the register that has just been freed.

6) acquire the next data item at an input, shift block 2A by one position and write it in the register that has just been freed.

7) return to step 3 until all the data items of a row minus 4 have been loaded, when a block 4A has just been written.

8) shift block 1A by one position, thereby sending the first encoded data item in output and write the fourth from last data item acquired in input on block 1A in the register that has just been freed.

9) select multiplexer 5A as an input to block 1A and shift blocks 2A and 1A by one position, thereby outputting a data item from 2A which is passed as an input to 1A and write the third from last data item acquired in input on block 2A in the register that has just been freed.

10) select multiplexer 6A as an input to block 2A and shift blocks 3A, 2A and 1A by one position, thereby outputting a data item from 3A which is passed as an input to 2A and a data item from 2A which is passed as an input to 1A, and write the next to last data item acquired as an input on block 3A in the register that has just been freed.

11) the same procedure is performed for writing the last data item on the block 4A and shifting all of the data items in the individual blocks up to the output.

12) the same technique (described in steps 1 to 11) is then applied for writing the next row in line B and simultaneously sending out the encoded data of line A.

13) the same technique is repeated for all of the rows, alternating the two lines A and B so that data is loaded into one line while data is sent out from the other line.

By adopting the above-described technique, it is possible to generate a flow of data for output Data out with the same frequency at input and with only an initial delay equal to a line minus four data items. The data in question is thus suitable for being transmitted over the bus B with reduced switching activity.

As illustrated in FIG. 4, it is possible to reduce switching activity even further by providing two additional modules, one on one side between the encoder 3 and the bus B and the other between the bus B and the decoder 4 on the other side. The two additional modules are respectively an encoder 3' and a decoder 4', which implement any type of known approach for reducing switching activity (the bus inverter technique for example). In this way, it is possible to further improve overall system performance.

The structure of the decoder 4 can be based on the same circuit layout represented in FIG. 5. By passing the encoded data to the input line 8 in FIG. 5 it is possible to acquire signals output from a circuit having the layout represented in FIG. 5 that corresponds to Bayer signals in the classical format. The processor 2 receives the data with the same frequency as the output from the sensor 1 with an initial delay equal to 2 lines minus four data items. This delay is given by the sum of the delays that arise at the encoder 3 level and at the decoder 4 level.

The approach according to the invention permits a considerable reduction to be achieved in the switching activity (SA) that is prone to arise on the connection bus B between the Bayer sensor 1 and the processor 2 that is to process the relative data. For example, by creating a line of 8 pixels (to reduce the size of the encoder as a whole and therefore without operating on the entire row), it is possible to achieve a reduction in switching activity of approximately 30%.

It will be appreciated that the present invention that has just been described allows the output of data to commence even before memorization of the row is completed. This permits savings on circuit components equivalent to 4 n-bit buffer memories, thus reducing the initial wait delay by 4 CLK pulses.

It will also be appreciated that the described technique is in no way restricted by the number of pixels utilized. The described approach is in fact applicable both in the described case in which the buffer contains the entire row and in the case in which the size of the buffer is different from the size of the row, or rather, for example, 4 pixels, half a row, one and half rows, two rows, etc.

With the principle of the invention being understood, the details disclosed herein could be extensively changed with respect to that described and illustrated above without leaving the scope of this invention, as defined by the enclosed claims.

That which is claimed is:

1. A process for converting digital video signals between a Bayer format and an encoded format, with pixels in each line of the Bayer format being alternately coded with two colors, each pixel having an upper and lower part, and the digital video signals in the encoded format having a reduced switching activity when transmitted over a bus as compared to the digital video signals in the Bayer format being transmitted over the bus, the process comprising:

ordering the pixels in sets of adjacent pixels in the encoded format, with the sets respectively grouping pixels that code a same color being performed by an encoder, and each set also grouping the upper and lower part of the pixels.

2. A process according to claim 1, wherein in the Bayer format, the pixels are organized as follows:

$P_{1,1}(R)H, P_{1,1}(R)L, P_{1,2}(G)H, P_{1,2}(G)L, \ldots, P_{1,n-1}(G)H, P_{1,n-1}(G)L, P_{1,n}(R)H, P_{1,n}(R)L, P_{2,1}(G)H,$
$P_{2,1}(G)L, P_{2,2}(B)H, P_{2,2}(B)L, \ldots, P_{2,n-1}(B)H,$
$P_{2,n-1}(B)L, P_{2,n}(G)H, P_{2,n}(G)L, \ldots, P_{m,1}(R)H,$
$P_{m,1}(R)L, P_{m,2}(G)H, P_{m,2}(G)L, \ldots, P_{m,n-1}(G)H,$
$P_{m,n-1}(G)L, P_{m,n}(R)H, P_{m,n}(R)L,$ where:
$P_{1,1}(R)H$=Pixel row 1, position 1 (Red) upper bits
$P_{1,1}(R)L$=Pixel row 1, position 1 (Red) lower bits
$P_{1,2}(G)H$=Pixel row 1, position 2 (Green) upper bits
$P_{1,2}(G)L$=Pixel row 1, position (Green) lower bits
. . .
$P_{m,n}(R)H$=Pixel row m, position n (Red) upper bits
$P_{m,n}(R)L$=Pixel row m, position n (Red) lower bits and, in the encoded format, the pixels are organized as follows:

$P_{1,1}(R)H, P_{1,3}(R)H, \ldots, P_{1,n}(R)H, P_{1,1}(R)L, P_{1,3}(R)L, \ldots P_{1,n}(R)L,$
$P_{1,2}(G)H, P_{1,4}(G)H, \ldots P_{1,n-1}(G)H, P_{1,2}(G)L, P_{1,4}(G)L, \ldots P_{1,n-1}(G)L,$
$P_{2,1}(G)H, P_{2,3}(G)H, \ldots, P_{2,n}(G)H, P_{2,1}(G)L, P_{2,3}(G)L, \ldots P_{2,n-1}(G)L,$
$P_{2,2}(B)H, P_{2,4}(B)H, \ldots, P_{2,n-1}(B)H, P_{2,2}(B)L, P_{2,4}(B)L, \ldots P_{2,n-1}(B)L,$
. . . ,
$P_{m,1}(R)H, P_{m,3}(R)H, \ldots, P_{m,n}(R)H, P_{m,1}(R)L, P_{m,3}(R)L, \ldots P_{m,n}(R)L,$
$P_{m,2}(G)H, P_{m,4}(G)H, \ldots, P_{m,n-1}(G)H, P_{m,2}(G)L, P_{m,4}(G)L, \ldots P_{m,n-1}(G)L.$ 3. A process according to claim 1, further comprising transmitting the digital video signals in the encoded format over the bus.

4. A process according to claim 3, further comprising performing an additional coding operation on the digital video signals being transmitted over the bus in the encoded format for further reducing switching activity on the bus.

5. A process according to claim 1, further comprising using a buffer having a size chosen among an entire row of signals and a different size from the size of the row, the process thereby being independent of a number of pixels used.

6. A process according to claim 5, wherein the size of the buffer is chosen from among the following: 4 pixels, half a row, a row, one and a half rows, and two rows.

7. A system for converting digital video signals between a Bayer format and an encoded format, with pixels in each line of the Bayer format being alternately coded with two colors, each pixel having an upper and lower part, and the digital video signals in the encoded format having a reduced switching activity when transmitted over a bus as compared to the digital video signals in the Bayer format being transmitted over the bus, the system comprising:

at least one converter element connected to the bus for converting between the Bayer format and the encoded format so that, in the encoded format, the pixels are ordered in sets of adjacent pixels, with the sets respectively grouping pixels that code a same color, and each set also grouping the upper and lower art of the pixels.

8. A system according to claim 7, wherein in the Bayer format, the pixels are organized as follows:

$P_{1,1}(R)H, P_{1,1}(R)L, P_{1,2}(G)H, P_{1,2}(G)L, \ldots, P_{1,n-1}(G)H, P_{1,n-1}(G)L, P_{1,n}(R)H, P_{1,n}(R)L, P_{2,1}(G)H,$
$P_{2,1}(G)L, P_{2,2}(B)H, P_{2,2}(B)L, \ldots, P_{2,n-1}(B)H,$
$P_{2,n-1}(B)L, P_{2,n}(G)H, P_{2,n}(G)L, \ldots, P_{m,1}(R)H,$
$P_{m,1}(R)L, P_{m,2}(G)H, P_{m,2}(G)L, \ldots, P_{m,n-1}(G)H,$
$P_{m,n-1}(G)L, P_{m,n}(R)H, P_{m,n}(R)L,$ where:
$P_{1,1}(R)H$=Pixel row 1, position 1 (Red) upper bits
$P_{1,1}(R)L$=Pixel row 1, position 1 (Red) lower bits
$P_{1,2}(G)H$=Pixel row 1, position 2 (Green) upper bits
$P_{1,2}(G)L$=Pixel row 1, position (Green) lower bits
. . .
$P_{m,n}(R)H$=Pixel row m, position n (Red) upper bits
$P_{m,n}(R)L$=Pixel row m, position n (Red) lower bits and, in the encoded format, the pixels are organized as follows:

$P_{1,1}(R)H, P_{1,3}(R)H, \ldots, P_{1,n}(R)H, P_{1,1}(R)L, P_{1,3}(R)L, \ldots P_{1,n}(R)L,$ $P_{1,2}(G)H, P_{1,4}(G)H, \ldots, P_{1,n-1}(G)H, P_{1,2}(G)L, P_{1,4}(G)L, \ldots P_{1,n-1}(G)L,$ $P_{2,1}(G)H, P_{2,3}(G)H, \ldots, P_{2,n}(G)H, P_{2,1}(G)L, P_{2,3}(G)L, \ldots P_{2,n-1}(G)L,$ $P_{2,2}(B)H, P_{2,4}(B)H, \ldots, P_{2,n-1}(B)H, P_{2,2}(B)L, P_{2,4}(B)L, \ldots P_{2,n-1}(B)L,$ $\ldots,$ $P_{m,1}(R)H, P_{m,3}(R)H, \ldots, P_{m,n}(R)H, P_{m,1}(R)L, P_{m,3}(R)L, \ldots P_{m,n}(R)L,$ $P_{m,2}(G)H, P_{m,4}(G)H, \ldots, P_{m,n-1}(G)H, P_{m,2}(G)L, P_{m,4}(G)L, \ldots P_{m,n-1}(G)L.$ 9. A system according to claim 7, wherein said at least one converter element comprises an encoder for converting the digital video signals from the Bayer format to the encoded format.

10. A system according to claim 9, further comprising a second encoder connected to said encoder for subjecting the digital video signals in the encoded format to an additional encoding operation for further reducing switching activity on the bus.

11. A system according to claim 7, wherein said at least one converter element comprises a decoder for converting the digital video signals from the encoded format to the Bayer format.

12. A system according to claim 11, further comprising a second decoder connected to said decoder for subjecting the encoded format to an additional decoding operation for further reducing switching activity on the bus, said second decoder providing the digital video signals to said decoder in the encoded format.

13. A system according to claim 7, wherein said at least one converter element comprises at least one sequence of registers containing the pixels of a respective row of the digital video signals, said at least one sequence of registers comprising:
 a first register for containing an upper part of a set of pixels that are in odd positions on the respective row;
 a second register for containing a lower part of the set of pixels that are in odd positions on the respective row;
 a third register for containing an upper part of a set of pixels that are in even positions on the respective row; and
 a fourth register for containing a lower part of the set of pixels that are in even positions on the respective row.

14. A system according to claim 13, wherein said first, second, third and fourth registers are sized to contain all data items relative to the digital video signals of a row minus 4.

15. A system according to claim 13, further comprising a control unit; and wherein said first, second, third and fourth registers form at least two sequences of mutually equivalent registers, and said control unit controls the at least two sequences of mutually equivalent registers for allowing, simultaneously and in an alternating sequence, loading of the digital video signals as an input into one of the equivalent sequences of mutually equivalent registers and outputting the converted digital video signals from the other equivalent sequence of mutually equivalent registers.

16. A system according to claim 15, wherein said control unit controls operation of the system such that the converted digital video signals are output before having finished storing the digital video signals arriving at the input for conversion.

17. A system according to claim 7, further comprising a buffer having a size chosen among an entire row of signals and a different size from the size of the row, the operation of the system thereby being independent of a number of pixels used.

18. A system according to claim 17, wherein the size of said buffer comprises at least one of the following: 4 pixels, half a row, one row, one and a half rows and two rows.

19. An apparatus comprising:
 an image sensor for providing digital video signals in a Bayer format, with pixels in each line of the Bayer format being alternately coded with two colors, and each pixel having an upper and lower part;
 an encoder connected to said image sensor for converting between the Bayer format and an encoded format so that, in the encoded format, the pixels are ordered in sets of adjacent pixels, with the sets respectively grouping pixels that code a same color, and each set also grouping the upper and lower part of the pixels;
 a bus connected to said encoder for transmitting the digital video signals in the encoded format;
 a decoder connected to said bus for receiving the digital video signals in the encoded format, and for converting between the encoded format and the Bayer format; and
 a processor connected to said decoder for processing the digital video signal in the Bayer format.

20. An apparatus according to claim 19, wherein in the Bayer format, the pixels are organized as follows:

$P_{1,1}(R)H, P_{1,1}(R)L, P_{1,2}(G)H, P_{1,2}(G)L, \ldots, P_{1,n-1}(G)H, P_{1,n-1}(G)L, P_{1,n}(R)H, P_{1,n}(R)L, P_{2,1}(G)H,$
$P_{2,1}(G)L, P_{2,2}(B)H, P_{2,2}(B)L, \ldots, P_{2,n-1}(B)H,$
$P_{2,n-1}(B)L, P_{2,n}(G)H, P_{2,n}(G)L, \ldots, P_{m,1}(R)H,$
$P_{m,1}(R)L, P_{m,2}(G)H, P_{m,2}(G)L, \ldots, P_{m,n-1}(G)H,$
$P_{m,n-1}(G)L, P_{m,n}(R)H, P_{m,n}(R)L,$ where:
 $P_{1,1}(R)H$=Pixel row 1, position 1 (Red) upper bits
 $P_{1,1}(R)L$=Pixel row 1, position 1 (Red) lower bits
 $P_{1,2}(G)H$=Pixel row 1, position 2 (Green) upper bits
 $P_{1,2}(G)L$=Pixel row 1, position (Green) lower bits
 . . .
 $P_{m,n}(R)H$=Pixel row m, position n (Red) upper bits
 $P_{m,n}(R)L$=Pixel row m, position n (Red) lower bits
 and, in the encoded format, the pixels are organized as follows:

$P_{1,1}(R)H, P_{1,3}(R)H, \ldots, P_{1,n}(R)H, P_{1,1}(R)L, P_{1,3}(R)L, \ldots P_{1,n}(R)L,$ $P_{1,2}(G)H, P_{1,4}(G)H, \ldots, P_{1,n-1}(G)H, P_{1,2}(G)L, P_{1,4}(G)L, \ldots P_{1,n-1}(G)L,$ $P_{2,1}(G)H, P_{2,3}(G)H, \ldots, P_{2,n}(G)H, P_{2,1}(G)L, P_{2,3}(G)L, \ldots P_{2,n-1}(G)L,$ $P_{2,2}(B)H, P_{2,4}(B)H, \ldots, P_{2,n-1}(B)H, P_{2,2}(B)L, P_{2,4}(B)L, \ldots P_{2,n-1}(B)L,$ $\ldots,$ $P_{m,1}(R)H, P_{m,3}(R)H, \ldots, P_{m,n}(R)H, P_{m,1}(R)L, P_{m,3}(R)L, \ldots P_{m,n}(R)L,$ $P_{m,2}(G)H, P_{m,4}(G)H, \ldots, P_{m,n-1}(G)H, P_{m,2}(G)L, P_{m,4}(G)L, \ldots P_{m,n-1}(G)L.$ 21. An apparatus according to claim 19, wherein said encoder and said decoder each comprises at least one sequence of registers containing the pixels of a respective row of the digital video signals, said at least one sequence of registers comprising:
 a first register for containing an upper part of a set of pixels that are in odd positions on the respective row;
 a second register for containing a lower part of the set of pixels that are in odd positions on the respective row;
 a third register for containing an upper part of a set of pixels that are in even positions on the respective row; and a fourth register for containing a lower part of the set of pixels that are in even positions on the respective row.

22. An apparatus according to claim 21, wherein said first, second, third and fourth registers are sized to contain all data items relative to the digital video signals of a row minus 4.

23. An apparatus according to claim 21, further comprising a control unit; and wherein said first, second, third and fourth registers form at least two sequences of mutually equivalent registers, and said control unit controls the at least two sequences of mutually equivalent registers for allowing, simultaneously and in an alternating sequence, loading of the digital video signals as an input into one of the equivalent sequences of mutually equivalent registers and outputting the converted digital video signals from the other equivalent sequence of mutually equivalent registers.

24. An apparatus according to claim 23, wherein said control unit controls operation of the apparatus such that the converted digital video signals are output before having finished storing the digital video signals arriving at the input for conversion.

25. An apparatus according to claim 19, further comprising a second encoder connected to said encoder for subjecting the digital video signals in the encoded format to an additional encoding operation.

26. An apparatus according to claim 19, further comprising a second decoder connected to said decoder for subjecting the encoded format to an additional decoding operation, said second decoder providing the digital video signals to said decoder in the encoded format.

27. An apparatus according to claim 19, further comprising a buffer having a size chosen among an entire row of signals and a different size from the size of the row, the operation of the apparatus thereby being independent of a number of pixels used.

* * * * *